(12) United States Patent
Ueta et al.

(10) Patent No.: US 9,415,463 B2
(45) Date of Patent: Aug. 16, 2016

(54) LASER MARKING METHOD

(75) Inventors: Hiroyasu Ueta, Hamamatsu (JP);
Minoru Inuzuka, Gamagori (JP);
Yutaka Tsujimoto, Osaka (JP)

(73) Assignees: Shizuoka Prefecture, Shizuoka-shi (JP);
Shikibo Ltd., Osaka-shi (JP); Nidek Co., Ltd., Gamagori-shi (JP)

( * ) Notice: Subject to any disclaimer, the term of this patent is extended or adjusted under 35 U.S.C. 154(b) by 0 days.

(21) Appl. No.: 13/145,847

(22) PCT Filed: Jan. 26, 2010

(86) PCT No.: PCT/JP2010/050956
§ 371 (c)(1),
(2), (4) Date: Sep. 23, 2011

(87) PCT Pub. No.: WO2010/087327
PCT Pub. Date: Aug. 5, 2010

(65) Prior Publication Data
US 2012/0013699 A1    Jan. 19, 2012

(30) Foreign Application Priority Data

Jan. 27, 2009   (JP) .................................. 2009-015751

(51) Int. Cl.
*B41M 5/382*  (2006.01)
*B23K 26/00*  (2014.01)
*B41M 5/26*   (2006.01)

(52) U.S. Cl.
CPC ......... *B23K 26/0066* (2013.01); *B23K 26/0006* (2013.01); *B41M 5/267* (2013.01); *B41M 5/382* (2013.01); *B41M 5/38207* (2013.01);

(Continued)

(58) Field of Classification Search
CPC ...... B41M 5/035; B41M 5/382; B41M 5/385; B41M 5/3852
See application file for complete search history.

(56) References Cited

U.S. PATENT DOCUMENTS 3,502,871 A * 3/1970 Marx et al. .................... 430/201
5,017,547 A * 5/1991 DeBoer ......................... 503/227

(Continued)

FOREIGN PATENT DOCUMENTS

CA    1245448 A1    11/1988
CN    1220761 A     6/1999

(Continued)

OTHER PUBLICATIONS

International Search Report dated Feb. 23, 2010, issued for PCT/JP2010/050956.

(Continued)

*Primary Examiner* — Alison L Hindenlang
(74) *Attorney, Agent, or Firm* — Locke Lord LLP

(57) ABSTRACT

This invention provides a laser marking method that can form a very minute mark of a predetermined shape, such as a letter or pattern, with clarity and high solidity, on the surface of a substrate. The laser marking method of the invention comprises the steps of (1) depositing a coloring material on the surface of a substrate of thermoplastic material to form a thin film of the coloring material, and (2) applying a laser beam to the thin film of the coloring material in conformity with a predetermined marking shape to cause the portions of the substrate irradiated with the laser beam to soften and to cause the thus softened portions to mix with the coloring material, thereby developing the predetermined marking shape on the surface of the substrate.

8 Claims, 10 Drawing Sheets

(52) U.S. Cl.
CPC ......... *B23K2201/18* (2013.01); *B23K 2203/00* (2013.01); *B23K 2203/42* (2015.10)

(56) References Cited

U.S. PATENT DOCUMENTS

| | | | |
|---|---|---|---|
| 5,239,158 A | | 8/1993 | Locklear et al. |
| 5,560,751 A | * | 10/1996 | Hoshiyama ........................ 8/506 |
| 5,608,429 A | * | 3/1997 | Hayashihara et al. ..... 346/135.1 |
| 6,177,132 B1 | | 1/2001 | Kunieda et al. |
| 2004/0013969 A1 | | 1/2004 | Delp et al. |
| 2004/0265572 A1 | * | 12/2004 | Baillet .......................... 428/336 |
| 2006/0257653 A1 | | 11/2006 | Tsujimoto et al. |

FOREIGN PATENT DOCUMENTS

| | | | |
|---|---|---|---|
| CN | 1741862 A | 3/2006 | |
| CN | 1788115 A | 6/2006 | |
| EP | 0201627 A2 | 11/1986 | |
| EP | 0924096 A1 | 6/1999 | |
| JP | H07-68802 A | 3/1995 | |
| JP | 07-117350 A | 5/1995 | |
| JP | 08-174263 A | 7/1996 | |
| JP | 11-180099 | 7/1999 | |
| JP | 2005-297326 A | 10/2005 | |
| JP | 2008-012869 A | 1/2008 | |
| JP | 2008012869 A * | 1/2008 | ............... B41M 5/26 |
| WO | WO-2004/050262 A1 | 6/2004 | |

OTHER PUBLICATIONS

European Search Report dated Mar. 6, 2014 in connection with European Application No. 10735795.6.

Office Action dated on May 20, 2016 issued for corresponding Korean Patent Application No. 10-2011-7019341.

* cited by examiner

LASER MARKING METHOD

TECHNICAL FIELD

The present invention relates to a laser marking method.

BACKGROUND ART

Known laser marking methods are disclosed, for example, in PTL 1 and PTL 2.

PTL 1 discloses forming a clear and hard-to-discolor marked part by laser marking in such a manner that a reaction coloring layer containing a colorant reactive with a laser beam is formed on the surface of a dyeable plastic substrate, a dyeing layer is formed with a combination color that makes the ground color of the coloring layer deeper by dyeing, and marking is performed by irradiation with a laser beam.

PTL 2 proposes a laser marking method in which the surface of a resin molded body is irradiated with a high-energy pulsed laser to mark a pattern, letter, or symbol of any form, wherein a resin powder containing inorganic particles is applied to the surface of the resin molded body, and a laser beam with a pulse of 1 kHz to 50 kHz is applied in conformity with a marking shape, thereby clearly developing the marking shape on the surface of the resin molded body.

However, the techniques described in PTL 1 and PTL 2 have a fatal defect in that marks formed by the laser marking methods are significantly inferior in clarity and solidity.

PTL 3 proposes a technique that overcomes this defect. According to PTL 3, a coloring-material-containing layer in which the coloring material is dispersed is formed on the surface of a substrate made of thermoplastic material, and a laser beam is applied to the coloring-material-containing layer in conformity with a predetermined marking shape to soften the portion of the substrate irradiated with the laser beam, so that the coloring material of the coloring-material-containing layer is mixed in the softened portion, thereby developing the predetermined marking shape on the surface of the substrate.

In this method, however, the formed coloring-material-containing layer is thick, and therefore, high output energy is required to fix the coloring material in the surface of the substrate by irradiation with a laser beam. As the output energy of a laser beam increases, the laser fluence also increases; consequently, it is inevitable that the size of the resulting mark becomes larger. Accordingly, it was difficult, even by the method of PTL 3, to draw very minute letters or patterns (e.g., about 20 µm in width) on substrate surfaces.

CITATION LIST

Patent Literature

PTL 1: Japanese Unexamined Patent Publication No. 2005-297326
PTL 2: Japanese Unexamined Patent Publication No. 8-174263
PTL 3: Japanese Unexamined Patent Publication No. 2008-12869

SUMMARY OF INVENTION

Solution To Problem

A primary object of the present invention is to provide a laser marking method that can form a very minute mark of a predetermined shape, such as a letter or pattern, with clarity and high solidity, on the surface of a substrate.

Solution To Problem

The present invention provides a laser marking method, a substrate with a mark, and a method of detecting the substrate, shown in the following Items 1 to 6:

Item 1. A laser marking method comprising the steps of:
(1) depositing a coloring material on the surface of a substrate of thermoplastic material to form a thin film of the coloring material; and
(2) applying a laser beam to the thin film of the coloring material in conformity with a predetermined marking shape to cause the portions of the substrate irradiated with the laser beam to soften and to cause the thus softened portions to mix with the coloring material, thereby developing the predetermined marking shape on the surface of the substrate.

Item 2. The laser marking method according to Item 1, wherein in step (1), the coloring material is deposited by a vapor-phase transfer method.

Item 3. The laser marking method according to Item 1 or 2, wherein the coloring material is at least one member selected from the group consisting of dyes and pigments.

Item 4. The laser marking method according to any one of Items 1 to 3, wherein the laser beam to be applied to the thin film of the coloring material in conformity with the predetermined marking shape is precisely focused.

Item 5. A substrate with a mark formed by the method according to any one of claims 1 to 4.

Item 6. A method of detecting a substrate with a mark formed by the method according to any one of claims 1 to 5, comprising the step of checking for the presence of the mark or pattern formed on the substrate.

The present invention is a laser marking method comprising the steps of:
(1) depositing a coloring material on the surface of a substrate of thermoplastic material to form a thin film of the coloring material; and
(2) applying a laser beam to the thin film of the coloring material in conformity with a predetermined marking shape to cause the portions of the substrate irradiated with the laser beam to soften and to cause the thus softened portions to mix with the coloring material, thereby developing the predetermined marking shape on the surface of the substrate. Steps (1) and (2) are described in detail below.

Step (1)

Step (1) of the present invention is to deposit a coloring material on the surface of a substrate of thermoplastic material to form a thin film of the coloring material.

The thermoplastic material used as the substrate is not particularly limited, as long as a laser-irradiated portion is melted or softened. The form of the substrate is not limited; for example, a sheet-like or fibrous substrate can be used.

As a sheet-like substrate, for example, a thermoplastic material of a uniform thickness (a plastic substrate) can be used. Examples of such thermoplastic materials include polyester, polystyrene, polypropylene, polycarbonate, polyamide, polyimide, acrylic resin, polyvinyl chloride, urethane resin, fluororesin, celluloid, isoprene rubber, butadiene rubber, styrene rubber, silicone rubber, etc. Among these sheet-like substrates, polyester, polypropylene, polycarbonate, acrylic resin, and polyvinyl chloride are preferable; polyester and polycarbonate are more preferable. Examples of polyesters include polyethylene terephthalate (PET), polytrimethylene terephthalate, polytetramethylene terephthalate, and the like. A preferable example of polyester is polyethylene terephthalate.

Examples of fibrous substrates include synthetic fibers, semi-synthetic fibers, regenerated fibers, inorganic fibers, and the like.

Examples of usable synthetic fibers include polyesters, aliphatic polyamides, aromatic polyamides, polyethylenes, polypropylenes, vinylons, acrylics, polyvinyl alcohols, polyurethanes, and the like.

Examples of usable semi-synthetic fibers include acetates, triacetates, promix, and the like.

Examples of usable regenerated fibers include rayon, cupra, and the like.

Among these fibrous substrates, synthetic fibers are preferable, and polyesters are more preferable. Specific examples of polyesters include polyethylene terephthalate, polytrimethylene terephthalate, polytetramethylene terephthalate, and the like.

The fibrous substrates may be used singly or spun, plied, or twisted together.

The fibrous substrates may have a core-sheath structure. Examples of artificial fibers with a core-sheath structure include those produced by using a slit yarn as a core and winding another fiber (spun yarn or filament yarn) therearound, those produced by using a spun yarn or filament yarn as a core and winding a slit yarn therearound, and those comprising a monofilament yarn with an internal core-sheath structure.

The artificial fibers may have a uniform or non-uniform thickness. The cross section of artificial fibers may have any shape, such as circular, elliptical, Y-shaped, cross-shaped, W-shaped, L-shaped, T-shaped, hollow, triangular, flat, star-shaped, cocooned, eight-leaved, or dog-bone shaped (or dumbbell).

The fibrous substrate includes not only these fibers but also primary processed products thereof, such as yarns, knits, woven fabrics, knitted fabrics, and nonwoven fabrics.

The fibrous substrate of the invention may be a blend fabric blended with natural fibers, such as cellulose fibers, animal hair fibers, and silks.

The coloring material to be deposited on the surface of such a substrate may be any material that can be deposited on the substrate under reduced pressure. Examples thereof include coloring materials that adhere to a substrate surface after being sublimated from solid to gas, coloring materials that adhere to a substrate surface after being transformed from solid to gas through liquid, and coloring materials that adhere to a substrate surface after being evaporated from liquid to gas. Coloring materials adhering to a substrate surface after being sublimated from solid to gas are generally called sublimation coloring materials. Depending on conditions, such as temperature and pressure, some sublimation coloring materials are deposited on a substrate surface after being transformed from solid to liquid and then to gas.

The thickness of the substrate is not particularly limited. For example, the thickness of a sheet-like substrate of thermoplastic material as described above is generally at least about 10 µm, preferably about 10 µm to 300 mm, more preferably about 30 µm to 10 mm, and most preferably about 50 µm to 3 mm.

As the method of depositing the coloring material on the surface of the substrate, for example, a vapor-phase transfer method, a vacuum deposition method, or the like can be used. These methods allow uniform application of the coloring material to the surface of the substrate, and formation of a thin film of the coloring material on the substrate surface.

In a vapor-phase transfer method, for example, a dyeing material in which the coloring material is dissolved or dispersed to fine particles is applied to a base material based on color data managed by using a computer; the base material is placed so that the coated surface, to which the dyeing material has been applied, is opposite to the substrate out of contact with each other in vacuum; and the base material is heated to evaporate and/or sublimate the coloring material, so that the coloring material is brought into contact with (deposited on) the substrate, thereby forming a thin film of the coloring material.

As the dyeing material (coloring material) usable in the present invention, dyes, pigments, etc., can be used. Among these, dyes are preferable, and disperse dyes or oil soluble dyes, which are sublimation dyes in which a coloring material is dissolved or dispersed to fine particles, are particularly preferable.

Furthermore, it is preferable to use a dye that, when used, is highly compatible with the substrate and can be mixed in the substrate upon irradiation of a weak laser beam in step (2).

Specific examples of dyeing materials (coloring materials) include C.I. Disperse Yellow, C.I. Disperse Red, C.I. Disperse Blue, C.I. Disperse Orange, C.I. Disperse Violet, C.I. Disperse Green, C.I. Disperse Brown, C.I. Disperse Black, C.I. Solvent Yellow, C.I. Solvent Orange, C.I. Solvent Red, C.I. Solvent Violet, C.I. Solvent Blue, C.I. Solvent Green, C.I. Solvent Brown, etc.

Specific examples of C.I. Disperse Yellow include C.I. Disperse Yellow 1, 2, 3, 4, 5, 6, 7, 8, 9, 10, 11, 12, 13, 14, 16, 17, 18, 19, 22, 24, 26, 27, 31, 32, 33, 34, 35, 42, 43, 44, 50, 51, 54, 56, 57, 58, 59, 60, 61, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 109, 110, 111, 112, 113, 114, 115, 116, 117, 118, 119, 120, 121, etc.

Specific examples of C.I. Disperse Red include C.I. Disperse Red 1, 2, 3, 4, 5, 6, 7, 8, 9, 10, 11, 12, 13, 14, 15, 16, 17, 18, 19, 20, 21, 22, 23, 25, 30, 31, 32, 33, 34, 35, 36, 38, 41, 43, 46, 50, 51, 53, 54, 55, 56, 58, 59, 60, 61, 63, 65, 66, 69, 70, 72, 73, 75, 76, 81, 82, 84, 85, 86, 87, 88, 89, 90, 91, 92, 93, 94, 96, 97, 98, 100, 102, 103, 104, 105, 106, 107, 108, 109, 110, 111, 112, 113, 115, 116, 117, 118, 120, 121, 122, 123, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 229, 302, etc.

Specific examples of C.I. Disperse Blue include C.I. Disperse Blue 1, 2, 3, 4, 5, 6, 7, 8, 9, 10, 11, 12, 13, 14, 15, 16, 17, 18, 19, 20, 21, 22, 23, 24, 26, 27, 28, 30, 31, 32, 33, 34, 35, 36, 38, 39, 40, 42, 43, 44, 45, 51, 52, 53, 54, 55, 56, 58, 60, 61, 62, 63, 64, 65, 66, 68, 70, 72, 73, 76, 77, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 111, 112, 113, 114, 115, 116, 117, 118, 119, 121, 122, 123, 124, 125, 126, 127, 128, 130, 131, 132, 133, 134, 136, 137, 138, 139, 140, 141, 142, 143, 144, 145, 146, 147, 148, 149, 150, 151, 152, 153, 154, 155, 156, 158, 159, 160, 161, 162, 163, 164, 165, 166, 167, 168, 169, 170, 171, 172, 173, 174, 175, etc.

Specific examples of C.I. Disperse Orange include C.I. Disperse Orange 1, 2, 3, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 42, 43, 44, 45, 47, 48, 49, 50, 51, 52, 53, 54, 55, 56, 57, 58, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, etc.

Specific examples of C.I. Disperse Violet include C.I. Disperse Violet 1, 2, 3, 5, 6, 7, 8, 9, 10, 11, 12, 13, 14, 15, 16, 17, 20, 21, 22, 23, 24, 25, 26, 27, 28, 29, 31, 33, 34, 35, 36, 37, 38, 39, 40, 41, 42, 43, 44, 45, 46, 47, 48, 49, 50, 51, 52, 53, 54, 55, 56, 57, 58, 59, 60, etc.

Specific examples of C.I. Disperse Green include C.I. Disperse Green 1, 2, 5, 6, etc.

Specific examples of C.I. Disperse Brown include C.I. Disperse Brown 1, 2, 3, 4, 5, 7, 8, 9, 10, 11, etc.

Specific examples of C.I. Disperse Black include C.I. Disperse Black 1, 2, 3, 4, 5, 6, 7, 8, 9, 10, 11, 12, 13, 14, 15, 20, 22, 24, 25, 26, 27, 28, 29, 30, 31, 32, 33, 34, etc.

Specific examples of C.I. Solvent Yellow include C.I. Solvent Yellow 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 54, 55, 56, 57, 58, 59, 60, 61, 62, 63, 64, 65, 68, 69, 70, 71, 72, 73, 74, 76, 77, 78, 79, 80, 81, 82, 83, 84, 85, 86, 87, 88, 89, 90, 91, 92, 93, 94, 95, 96, 97, 98, 99, 100, 101, etc.

Specific examples of C.I. Solvent Orange include C.I. Solvent Orange 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, etc.

Specific examples of C.I. Solvent Red include C.I. Solvent Red 1, 2, 3, 4, 5, 6, 7, 8, 9, 10, 11, 12, 13, 14, 15, 16, 17, 18, 19, 20, 21, 22, 23, 24, 25, 26, 27, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 63, 64, 65, 66, 67, 68, 69, 70, 71, 72, 73, 74, 75, 76, 77, 78, 79, 80, 81, 82, 83, 84, 85, 86, 87, 89, 90, 91, 92, 96, 97, 98, 99, 100, 102, 103, 104, 105, 106, 108, 109, 110, 111, 112, 113, 114, 115, 116, 117, 118, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 155, etc.

Specific examples of C.I. Solvent Violet include C.I. Solvent Violet 1, 2, 3, 4, 5, 7, 8, 9, 10, 11, 12, 13, 14, 15, 16, 17, 18, 19, 21, 22, 23, 24, 25, 26, 27, 29, 30, etc.

Specific examples of C.I. Solvent Blue include C.I. Solvent Blue 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 48, 49, 50, 51, 52, 53, 54, 55, 56, 57, 58, 59, 60, 61, 63, 64, 65, 66, 67, 68, 69, 70, 71, 72, 73, 74, 75, 76, 78, 79, 80, 81, 82, 83, 84, 85, 86, 87, 97, 104, etc.

Specific examples of C.I. Solvent Green include C.I. Solvent Green 1, 2, 3, 4, 5, 6, 7, 8, 9, 10, 11, 12, 13, 14, 15, 16, 17, 18, 19, 20, 21, 22, 23, 24, 25, etc.

Specific examples of C.I. Solvent Brown include C.I. Solvent Brown 1, 2, 3, 4, 5, 6, 7, 8, 9, 10, 11, 12, 13, 14, 15, 16, 17, 18, 19, 20, 21, 22, 23, 24, 25, 26, 27, 28, 29, 31, 34, 35, 36, 37, 38, 39, 40, 41, 42, 43, and 44; and C.I. Solvent Black 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, etc.

These dyeing materials can be used singly or in a combination of two or more.

In the present invention, it is particularly preferable to use, among these dyeing materials, at least one member selected from the group consisting of C.I. Disperse Yellow 51, 54, 64, and 65; C.I. Disperse Red 4, 15, 22, 55, 59, 60, 86, 91, 92, 127, 146, 152, 189, 191, 229, and 302; C.I. Disperse Violet 17; C.I. Disperse Blue 14, 56, 60, 72, 73, and 77; C.I. Solvent Red 155; and C.I. Solvent Blue 35, 36, 97, and 104.

In the vapor-phase transfer method, when a deposition apparatus, such as a vacuum deposition apparatus, is used to evaporate and/or sublimate the coloring material by resistance heating, the dyeing material can be used as it is; however, when, for example, a transfer paper printed with the dyeing material is used, the dyeing material may be used after being dispersed in water or dissolved in a solvent to form a ink. Examples of such inks include Bafixan® Dye-Sublimation Ink (produced by BASF A.G.), etc.

FIG. 1 shows a conceptual diagram in which a coloring material is evaporated and/or sublimated using a vacuum deposition apparatus to thereby deposit the coloring material on a substrate surface.

As shown in FIG. 1, a dyeing material is directly placed on a boat in the vacuum deposition apparatus, and the coloring material is evaporated and/or sublimated by resistance heating. As described above, whether the coloring material is deposited on a substrate surface after being evaporated from liquid to gas or after being sublimated from solid to gas depends on the type of dyeing material and conditions such as temperature and pressure during deposition; however, either deposition method is acceptable, as long as the coloring material is deposited on the substrate surface.

Moreover, when an ink of the dyeing material containing a solvent, etc., is used as the dyeing material, the coloring material thin film formed on the substrate surface possibly contains such a solvent component, etc.; however, the coloring material thin film may contain components other than the coloring material, as long as they do not obstruct the mixing of the coloring material in the substrate by laser irradiation in step (2).

A commercially available vacuum deposition apparatus can be used; for example, BMC-800T (produced by Shincron Co., Ltd.) can be used.

When a vacuum deposition apparatus is used, the amount of coloring material to be deposited is measured with a monitor glass so as to control the amount to be applied to the surface of a substrate (e.g., a plastic substrate or a fiber). The substrate may be fixed by using a stand, etc., in a position that allows the deposition of the coloring material evaporated and/or sublimated from the boat; however, the substrate is fixed in a position that does not obstruct the monitor glass or a shutter (for preventing deposition of the medicine or dye). For this purpose, the distance between the substrate surface and the dyeing material on the boat is required to be about 30 mm or more. However, when the distance is too large, a small amount of coloring material reaches the substrate, failing to form a coloring material thin film that has a thickness sufficient for forming a mark. Accordingly, the distance between the substrate surface and the dyeing material on the boat is preferably about 1000 mm or less, and more preferably about 500 mm or less.

The vapor-phase transfer conditions (e.g., vacuum degree, transfer paper temperature, and substrate temperature) vary depending on the type of substrate, the desired thickness of the coloring material film, etc. For example, the degree of vacuum may be about 2.0 kPa or less, and generally about 0.1 to 2 kPa. A vacuum deposition apparatus can increase the degree of vacuum to about $10^{-3}$ Pa; however, a low degree of vacuum does not cause problems.

Moreover, when a transfer paper is used, although the temperature of the transfer paper varies depending on the type of substrate, the type of dye, the desired thickness of the coloring material film, etc., the temperature is generally about 70 to 250° C., preferably about 100 to 200° C., and more preferably about 120 to 180° C.

Although the temperature of the substrate varies depending on the type of substrate, the type of dye, the desired thickness of the coloring material film, etc., the temperature is generally about 1 to 100° C., preferably about 5 to 70° C., and more preferably about 5 to 50° C.

The vapor-phase transfer apparatus may be any vacuum apparatus that can maintain a predetermined vacuum state inside the apparatus, and that can heat a transfer paper to which ink has been applied and which is placed in the apparatus in contact or out of contact with the paper. For example, "TTM-1000" or "TTM-2000" (both are produced by Nidek Co., Ltd.) can be used.

In the present invention, a very thin coloring material film is formed on a substrate surface by a vapor-phase transfer method, etc., and the substrate surface can thereby be softened or melted with a laser beam even at low output energy and low fluence. This enables the formation of a very minute mark (about 20 μm in size), which was conventionally difficult to form, on the substrate surface.

The size of the mark that can be formed by the method of the present invention is generally about 20 to 100 μm, although it varies depending on the type of pattern or letter. A mark larger than 100 μm in size can be easily formed by increasing the thickness of the coloring material film, and raising laser beam energy. In contrast, a very minute mark (about 20 μm in size) was difficult to form by a conventional method; however, the method of the present invention can decrease the thickness of the coloring material film on the substrate surface and allows the formation of a very minute pattern or letter (about 10 to 20 μm in size) on the substrate surface, as long as the pattern or letter is simple.

According to the present invention, the thickness of the coloring material thin film to be formed can be suitably determined depending on the size of the desired mark. For example, the thickness of the coloring material thin film is about 0.1 to 20 μm, preferably about 0.5 to 5 μm, and more preferably about 0.5 to 2 μm.

The following describes in detail the procedure of depositing a coloring material on the surface of a substrate, such as a plastic substrate or a fiber. First, the dyeing material (coloring material) is placed on the boat in the chamber of the vacuum deposition apparatus, and the substrate is fixed. The air is then evacuated. When the degree of vacuum reaches a predetermined level, i.e., 2.0 kPa or less, a resistance heater is powered to heat the dyeing material (coloring material) to be evaporated and/or sublimated. While checking the deposition amount of the coloring material indicated in the monitor glass, when the deposition amount reaches a predetermined level, the shutter is closed, the power to the resistance heater is turned off, and the pressure of the chamber is returned to atmospheric pressure. The substrate coated with the coloring material is taken out, and then subjected to marking by laser irradiation in the subsequent step (2).

FIGS. 2 and 3 show conceptual diagrams in which a coloring material is evaporated and/or sublimated using a transfer paper, as described above. The following describes the evaporation and/or sublimation of a coloring material using a transfer paper.

In order to evaporate and/or sublimate a coloring material using a transfer paper and to precisely coat the substrate surface with a coloring material film of a desired thickness, it is necessary to accurately print a required amount of the dyeing material (coloring material) on the transfer paper. For this purpose, it is suitable to use an ink-jet printer, etc., to print the dyeing material.

A commercially available ink-jet printer can be used; for example, RJ-130V2 (produced by Mutoh Industries Ltd.), EPSON MJ-8000C, EPSON PX6200S, or the like can be used.

Moreover, the printing software may be commercially available graphics software or drawing software; for example, Photoshop® can be used.

The transfer paper may be a commercially available printer paper or transfer paper designed for vapor-phase transfer; for example, a transfer paper for vapor-phase transfer produced by Nidek Co., Ltd., can be used.

When using an ink-jet printer, etc., it is preferable to use, among the above-described dyeing materials, an ink in which a sublimation disperse dye or oil-soluble dye is dispersed in water in the form of fine particles. In this case, the ink may contain a dispersant, surfactant, moisturizer, viscosity modifier, pH adjuster, etc., if necessary, so as to meet the specification of the ink-jet head. An example of the ink is an ink-jet sublimation ink (Bafixan® Dye-Sublimation Ink, produced by BASF A.G.).

The ratio of dye in ink is generally about 0.1 to 20.0 wt. %, and preferably about 1.0 to 5.0 wt. %.

An ink-jet printer is not the only option; it is sufficient to precisely control the amount of dyeing material (coloring material). For example, screen printing, offset printing, or the like can be used, as long as the amount of dyeing material (coloring material) can be controlled.

Thus, the dyeing material (coloring material) is first printed on a transfer paper using an ink-jet printer, etc. Subsequently, the transfer paper printed with the dyeing material (coloring material) and a substrate (e.g., a plastic substrate or a fiber) are placed in a vacuum apparatus for vapor-phase transfer. As shown in FIGS. 2 and 3, the vacuum apparatus comprises a vacuum pump for evacuating the inside of the apparatus to a vacuum, and a heating means for heating the transfer paper in a contact or non-contact manner. The heating means may be a heater plate, an infrared-ray radiating lamp, or the like. Further, a fixing member (e.g., a stand) is provided in the apparatus to fix the transfer paper or the substrate so that the transfer paper and the substrate are opposed in a non-contact manner. The fixing member may be fixed in the vacuum apparatus. Using such a vacuum apparatus, the transfer paper and the substrate are fixed in a non-contact manner in the apparatus. In this case, the transfer paper and the substrate are fixed so that the substrate surface is opposed to the surface of the transfer paper printed with the dyeing material (coloring material). Moreover, when the transfer paper is fixed in the apparatus, the paper is fixed so that the back of the printing surface is opposed to the heating means (heater plate or infrared-ray radiating lamp). The substrate is fixed in a position at a predetermined distance from the heating means via the transfer paper. The position may be below or above the heating means, as long as the substrate is firmly fixed (see FIGS. 2 and 3).

Next, the vacuum apparatus is evacuated to a vacuum (about 0.2 kPa or less), and the heater is then powered to heat the transfer paper so that the dyeing material (coloring material) is evaporated and/or sublimated, thereby depositing the coloring material on the substrate surface. In this case, the temperature of the transfer paper is required to be about 70° C. or more in order to sublimate the coloring material; however, when the temperature of the transfer paper is too high, the temperature of the substrate (e.g., plastic substrate or fiber) also becomes too high, which may cause deformation of the substrate, dyeing, or mixing of the coloring material into the substrate, etc. In order to prevent the deformation of the substrate and the dyeing or mixing of the coloring material, the temperature of the transfer paper is generally preferably about 200° C. or less, although it depends on the type of substrate. After the deposition of the coloring material on the substrate surface is completed, the leak valve is opened to return the vacuum apparatus to atmospheric pressure. The substrate on which the coloring material thin film has been formed is taken out, and then irradiated with a laser beam to form a mark in step (2), described later.

Step (2)

Step (2) is to apply a laser beam to the coloring material thin film formed in step (1) in conformity with a predetermined marking shape to cause the portions of the substrate irradiated with the laser beam to soften or melt and to cause the thus softened or melted portions to mix with the coloring material, thereby developing the predetermined marking shape on the surface of the substrate.

The transfer of the coloring material to the substrate occurs as follows. The portion of the coloring material thin film irradiated with a laser beam is heated by the energy of the irradiated laser beam. The surface of the substrate is also heated by the heat, and thereby softened or melted. The coloring material is mixed in or stains the softened or melted portion. As the temperature decreases, the mixed or staining coloring material is cured together with the substrate and fixed in the surface or inside of the substrate.

As described above, in the present invention, the thickness of the coloring material thin film formed on the surface of the substrate is very thin; therefore, the substrate can be softened or melted with a laser beam of relatively low energy. Consequently, a very minute letter or pattern (e.g., about 20 μm in size), which was very difficult to form by a conventional method, can be developed in the desired hue with clarity and high solidity. FIGS. 4 and 5 schematically illustrate that the size of the mark varies with the thickness of the coloring material film and the intensity of laser energy. As shown in FIGS. 4 and 5, when the coloring material film is thick, it is necessary to irradiate the substrate with a laser beam of higher energy (higher fluence) to soften or melt the substrate surface. Accordingly, the size of the resulting mark is larger.

The thinner the coloring material thin film is, the more easily the substrate surface can be softened or melted by a laser beam of less energy. Consequently, a very minute mark can be formed on the substrate.

As described above, coloring materials such as the aforementioned dyes and pigments can be used as the dyeing material in the present invention.

When a dye is used as the dyeing material, the dye sublimated by the heat generated by laser beam irradiation permeates into the surface of the substrate, which is softened or melted by laser beam irradiation, to stain the substrate. The softened or melted portion is cured as the temperature decreases, and so the coloring material is fixed in the surface of the substrate. Thus, the dye used as the dyeing material only stains the surface and inside of the substrate softened, etc., by laser beam irradiation, and the subsequent temperature decrease results in the curing of the dye in the surface and inside of the substrate, thereby developing a marking shape with clarity and solidity high enough to be resistant to washing, abrasion, etc.

Moreover, when a pigment is used as the dyeing material in the present invention, the pigment is mixed in the surface and inside of the substrate softened or melted by laser beam irradiation, and the pigment remains therein in that state. The softened portion is cured as the temperature decreases, and so the pigment is fixed in the surface and inside of the substrate. Since the pigment used as the dyeing material is thus transferred to the softened portion of the substrate surface, and mixed and fixed in the substrate, a high contrast relative to the surrounding of the laser-beam-irradiated portion can be obtained, thereby developing a marking shape with clarity and solidity high enough to be resistant to washing, abrasion, etc.

After the coloring material is fixed in the surface and inside of the substrate by laser beam irradiation, the substrate surface is wiped with a solvent (e.g., alcohol) to remove the portion on which the coloring material is not fixed (coloring material thin film), thereby forming a desired mark on the substrate surface.

In the present invention, a surfactant may be applied in advance to the surface of the substrate. The application of a surfactant to the substrate surface improves the adhesion of the coloring-material-containing layer to the substrate. Thus, when the spot diameter of the laser beam on the substrate surface is as minute as, for example, 1 to 20 μm, the coloring material can be reliably transferred to the surface and inside of the substrate to thereby form a clear and solid mark.

Furthermore, in the present invention, the laser beam applied to the coloring material thin film in conformity with the predetermined marking shape may be precisely focused. Because the laser beam is precisely focused on the coloring material thin film on the substrate surface, the energy density of the portion irradiated with a laser beam increases. The coloring material is mixed in the softened portion of the substrate in the area with a high energy density, and the coloring material develops color without changing the color. Thus, minute letters or patterns can be clearly developed with the desired color.

FIG. 6 is a flow diagram showing an example of a schematic structure of a laser irradiation apparatus 1 that is used to carry out the laser beam irradiation process of step (2). The laser irradiation apparatus 1 is used to carry out the laser beam irradiation process of step (2). The laser irradiation apparatus 1 is also called a laser marker, in which a laser beam 3 emitted from a laser beam generating means 2 is reflected almost at a right angle by a beam splitter 4, and the reflected laser beam passes through an objective lens 5 and is focused on the surface 6 of a substrate W.

The laser irradiation apparatus may be one shown in FIG. 6, which is a combination of a VLD unit, an optical system including an objective lens, an XY stage, etc. A galvanometer can be used in place of the XY stage.

The substrate W is placed on the XY stage 8 and maintained so that the surface 6 is perpendicular to the optical axis 7 of the laser beam reflected by a beam splitter 4. The XY stage 8 is configured to move the substrate W placed thereon in the X and Y directions, which are at right angles to each other on a flat XY surface, to accurately position the substrate W at the laser beam irradiation position so that the optical axis 7 of the laser beam is perpendicular to the surface 6.

Examples of the substrate W are as described above, which are made of material that is melted or soften upon laser beam irradiation at the irradiated portion. A mark of the predetermined shape, such as a letter or pattern, is formed on the surface 6 of the substrate W. The objective lens 5 is supported by a Z stage 9 so that the lens is movable in the Z direction with high accuracy in order to adjust its focus to the height position of the surface 6 of the substrate W placed on the XY stage 8.

In the laser irradiation (generating) means 2, a diffused light emitted from a laser oscillator 21 is converted into a parallel light with a collimate lens 22; the parallel light penetrates a correcting plate 23 so that the light is precisely focused by an objective lens 5 in the subsequent stage; and a laser beam 3, which is subjected to wavefront correction so that the wavefront aberration of the laser beam is adjusted to a value required to obtain light-collecting ability (e.g., a wavelength of λ/4 or less), is emitted. The laser oscillator 21 is achieved by using a laser diode (abbreviated "LD") that emits a blue-purple laser beam with a wavelength of 405 nm.

The beam splitter 4 is achieved by using a half mirror that reflects a guiding laser beam in the visible range at a high reflectance (e.g., 90% or more) and that transmits a laser beam with a wavelength of about 450 nm or less.

The correcting plate 23 is achieved by using a phase compensator made of synthetic resin. The correcting plate 23 is used for the following reason. Since the divergence angle of the light emitted from the LD is large, it is necessary to use an objective lens 5 with a low F value (i.e., beam diameter/focal distance) to sensitively reflect the relationship between the objective lens 5 and the position of the LD; however, there is a limitation in increasing the optical performance of the objective lens 5 and the installation accuracy to the LD. In order to overcome the limitation, the wavefront aberration is kept to, for example, a wavelength of λ/4 or less by using the correcting plate 23.

Since the laser beam 3 converted into a parallel light through the collimating lens 22 is subjected to wavefront correction by using the correcting plate 23, when the output energy of the laser oscillator 21 is 0.1 W, the peak power intensity in a light spot (spot size: 2 μm or more and 3 μm or less) can be achieved at a high light focus density (i.e., 0.1 to 1 MW/cm$^2$, and a laser beam 3 having a unimodal intensity distribution can be obtained. The objective lens 5 is achieved by using a condenser lens with a focal distance of, for example, about 15 mm.

In order to measure the focusing state of the laser beam 3 on the substrate W, a measurement means 13 is provided behind the beam splitter 4. The measurement means 13 is used to observe the irradiation state of the laser beam 3 to the substrate W in such a manner that the reflected light of the laser beam 3 applied to the substrate W is focused onto a light-receiving surface of an imaging camera 15 by a lens 14. If necessary, the lens 5 is adjusted to maintain the best focusing pattern. The imaging camera 15 includes a charge-coupled device (abbreviated "CCD").

Furthermore, for example, a filter can be placed between the beam splitter 4 and the lens 5, or between the laser beam generating means 2 and the beam splitter 4. The output energy of the laser can be attenuated through the filter, thereby adjusting the energy of the laser applied to the coloring material thin film 27 formed on the surface of the substrate. A commercially available filter can be used; for example, an absorption fixed ND filter produced by Sigma Koki Co., Ltd., (AND-50S-30, AND-50S-50, or AND-50S-70) can be used. The filter can be placed in any position, as long as the output energy of the laser is attenuated. For example, the position may be anywhere between the beam splitter 4 and the lens 5, or between the laser beam generating means 2 and the beam splitter 4.

As described above, the clarity of the mark varies depending on the thickness of the coloring material film and the intensity of laser energy. This is obvious from the results of the Examples, described later.

Moreover, the arithmetic processing means 16 is achieved by using a personal computer. The display screen 17 of the arithmetic processing means enlarges the laser-irradiated area of the surface 6 of the substrate W or the coloring material thin film 27, allowing visual observation of the marking state by laser irradiation.

FIG. 7 is an enlarged cross-sectional view of the vicinity of the laser-beam-irradiated position of the substrate W. The coloring material thin film 27 is formed on the surface 6 of the substrate W. Examples of the coloring material forming the thin film 27 are as described above.

The phenomenon in which a marking shape is developed by irradiation of the substrate W with a laser beam is roughly classified into four types: foaming, condensation, carbonization, and chemical change of the substrate W. The main part of the laser marking method of this embodiment is chemical change, and in particular, sublimation of the coloring material due to heat. Specifically, as a result of mixing of the coloring material in the substrate W by sublimation heat transfer, the laser-beam-irradiated portion corresponding to a predetermined letter or pattern develops color with a different hue, color saturation, and lightness from the surrounding, and is apparently recognized as the development of the marking shape. Color development of the marking shape may be achieved by reflection of visible light or by irradiation with ultraviolet light (fluorescence color development), as described later. Additionally, patterning may be performed using an infrared absorbing agent.

Sublimation heat transfer is a kind of vapor-phase dyeing utilizing the sublimation dye affinity of the coloring material (disperse dye). The uniformly formed coloring material thin film 27 is dried and pulse-irradiated with a laser beam while moving the XY stage 8 in the X and Y directions at a rate of 1 to 5 mm/s. The coloring material (disperse dye) in the coloring material thin film 27 is gasified on the surface 6 of the substrate W by laser beam irradiation. The surface of the substrate W in contact with the gasified coloring material is also heated by laser beam irradiation to be melted or softened to an almost molten state, and the coloring material permeates into the inside of the softened portion and is thereby transferred. The sublimation heat transfer has advantages in that industrial waste, such as organic solvent waste, is not generated, causing no pollution to air or water, and thus inducing no environmental pollution.

In this embodiment, a pigment may be used in place of the disperse dye. Pigments are dispersed in a solvent in the form of particles with a particle size of 50 nm to 3 μm, which themselves develop color, unlike dyes. A pigment is dispersed in a vehicle (also called a thickening agent), and then applied to the surface 6 of the substrate W. The pigment diffusely reflects light because of its large particles, and the decrease in color saturation due to color mixing is greater than dyes. Although dyes have high permeability through the substrate W, while pigments have low permeability through the substrate W, when either a dye or pigment is used, the portion of the surface and vicinity of the substrate irradiated with a laser beam is softened or melted, the dye or pigment permeates into the substrate W in a dispersed state, the dye or pigment is cured in the irradiation portion in a mixed state when the laser beam irradiation is stopped, and the dye or pigment transferred to the substrate W is fixed in the surface 6 and inside of the substrate W.

The substrate (in particular, fiber or fiber product) with a mark formed by the method of the present invention makes it possible to determine whether a marketed substrate is marked or unmarked by checking for the presence of a mark or pattern marked on the substrate.

More specifically, using the method of the present invention, a substrate marked with letters or patterns is produced by irradiating the substrate with a laser beam. Marketed substrates can then be checked (examined) for the presence of the letters or patterns to determine whether the substrates are authentic or counterfeit. The above checking can be carried out with the naked eye, a magnifying glass, a microscope, etc.

The substrate (in particular, fiber or fiber product) with a mark formed by the method of the present invention can be used to determine whether processed products of the substrate are authentic or counterfeit by checking for the mark of the substrate contained in the processed products. Examples of such processed products include outer garments, intermediate garments, innerwear and like clothing, beds and bedroom accessories, interior accessories, and the like. Specific examples thereof include clothing, such as coats, jackets, trousers, skirts, shirts, knitted shirts, blouses, sweaters, cardigans, nightwear, underwear, supporters, socks, tights, hats, scarves, mufflers, gloves, garment linings, garment stiffeners, cotton stuffing for clothes, work clothing, sanitary gowns, uniforms, prison uniforms, schoolchildren's uniforms, and the like; woven labels, item tags, name tags, paper tags, fasteners, and the like; beds and bedroom accessories, such as mattress coverings, wadding cotton, pillow cases, sheets, and the like; interior accessories, such as curtains, mats, carpets, cushions, stuffed toys, and the like; fancy goods, such as towels, handkerchiefs, and the like; yarn products, such as machine sewing thread, embroidery thread, plaited cords, straps, braids, fishing line, and artificial baits; tags on merchandise; paper products or nonwoven fabrics; bags; materials for electronic products; construction materials; and the like.

Specific examples of paper products include securities such as stocks, national bonds, local bonds, gift vouchers, drafts, checks, postage stamps, revenue stamps, certificate stamps and admission tickets; vouchers such as coupons and lottery tickets; paper currency; seals; various kinds of certificate forms, and the like.

Advantageous Effects of Invention

In the present invention, a very thin coloring material film is formed on a substrate surface by a vapor-phase transfer method, etc., and the substrate surface can thereby be softened or melted with a laser beam even at low output energy and low fluence. This enables the formation of a very minute mark (about 20 μm in size), which was conventionally difficult to form, on the substrate surface. The marking shape can be developed in the desired hue with clarity and high solidity.

Moreover, since very minute marks, such as letters or symbols, and patterns can be produced on substrates by the method of the present invention, individual yarns can be marked with marks, such as letters and symbols.

Name-brand products partially or entirely made of the fiber of the invention can be marked with a brand mark or pattern that cannot be discerned by the naked eye but is discernable under a magnifying glass or a microscope, thereby allowing one to easily determine whether marketed products are authentic or counterfeit articles, and thus effectively preventing the counterfeiting of brand name products.

DESCRIPTION OF EMBODIMENTS

The main devices used in the Examples are as follows.
Gas-phase transfer unit: A vacuum apparatus capable of heating a transfer paper in a non-contact manner in a vacuum atmosphere was used. In the Examples, "TTM-1000" (produced by Nidek Co., Ltd.) was used.
Ink-jet printer: RJ-1300V/2 ink-jet printer, produced by Mutoh Industries, Ltd.
XY stage: product of Mecha Industry Co., Ltd.
Laser microscope: LEXT OLS3000 confocal laser scanning microscope, produced by Olympus Corporation

EXAMPLES 1 TO 12

Experimental Device

Figure 6:
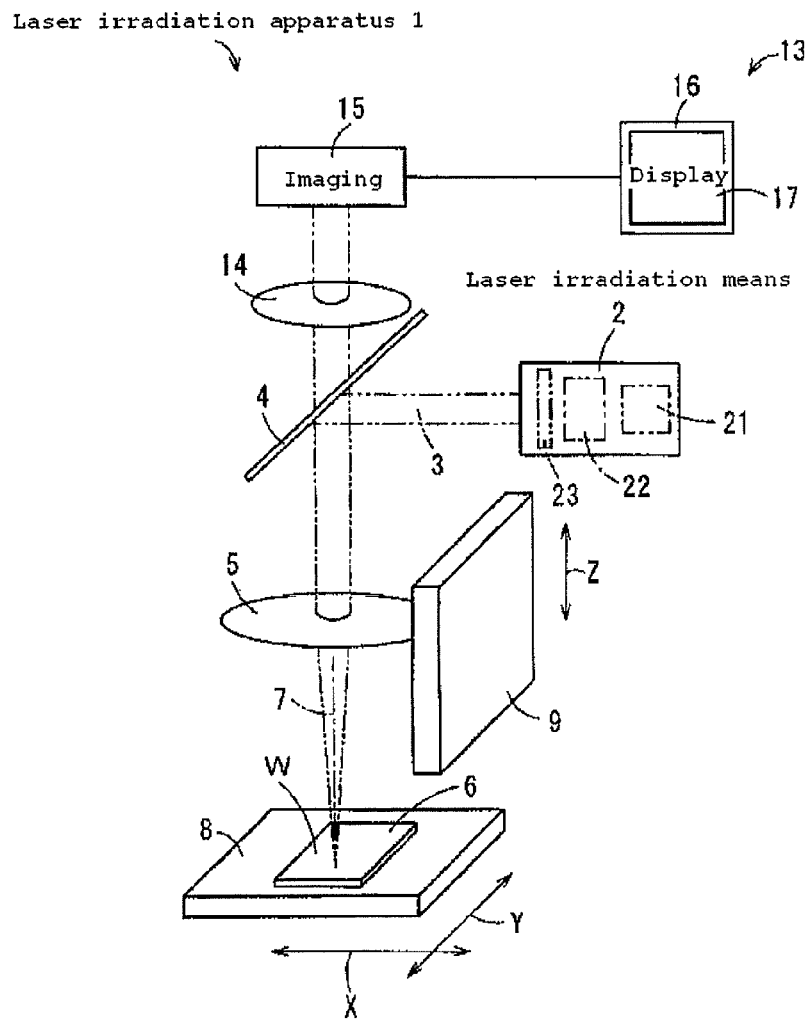
FIG. 6 is a flow diagram showing an example of a schematic structure of a laser irradiation apparatus 1 that is used to carry out the laser beam irradiation process of step (2).
Figure 7:
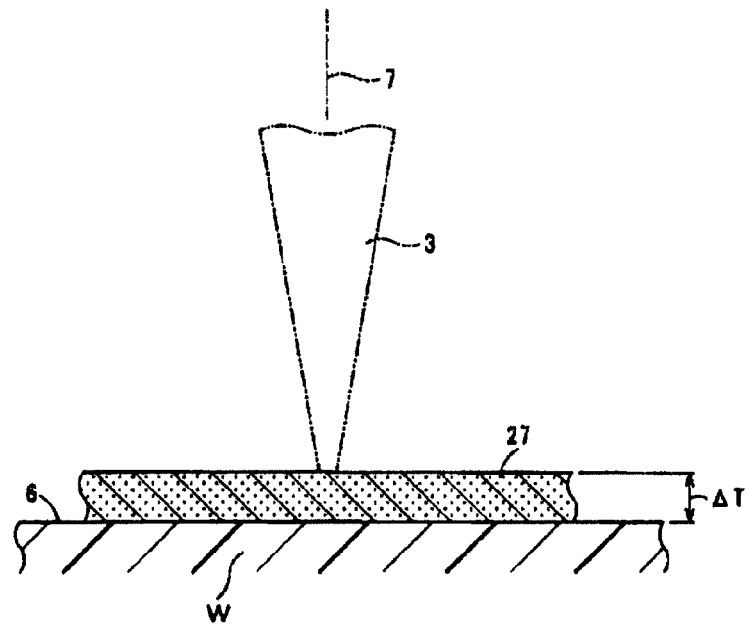
FIG. 7 is an enlarged cross-sectional view of the vicinity of the laser beam-irradiated portion of the substrate W.
Figure 8:
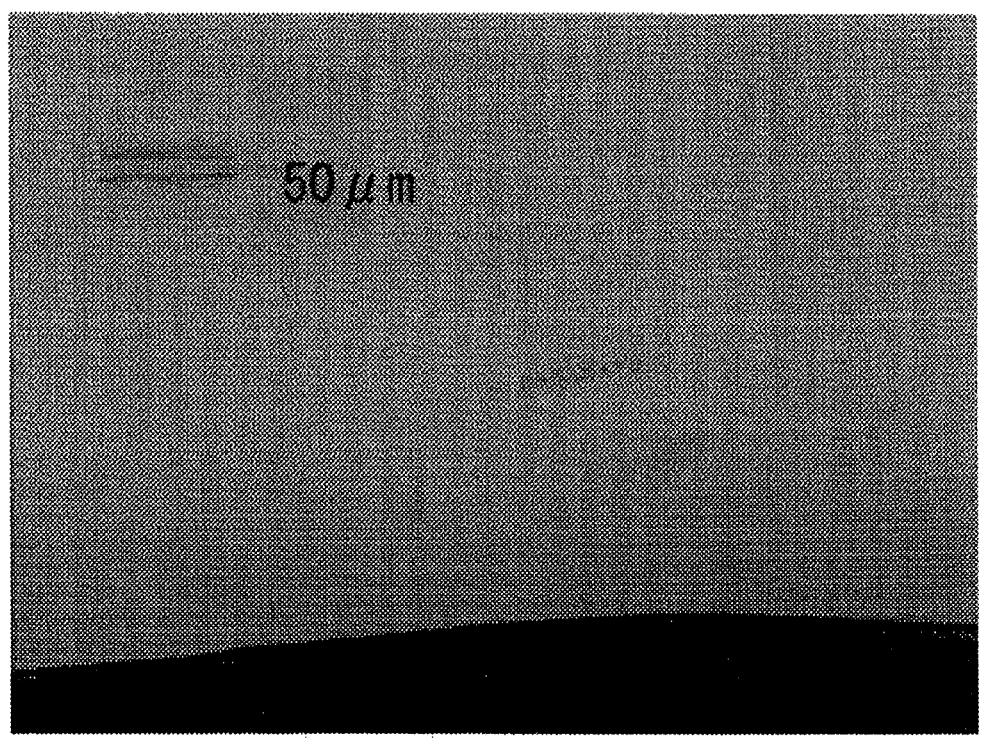
FIG. 8 is an enlarged view of the mark obtained in Example 1 (30 μm, blue marking, ×2).
Figure 9:
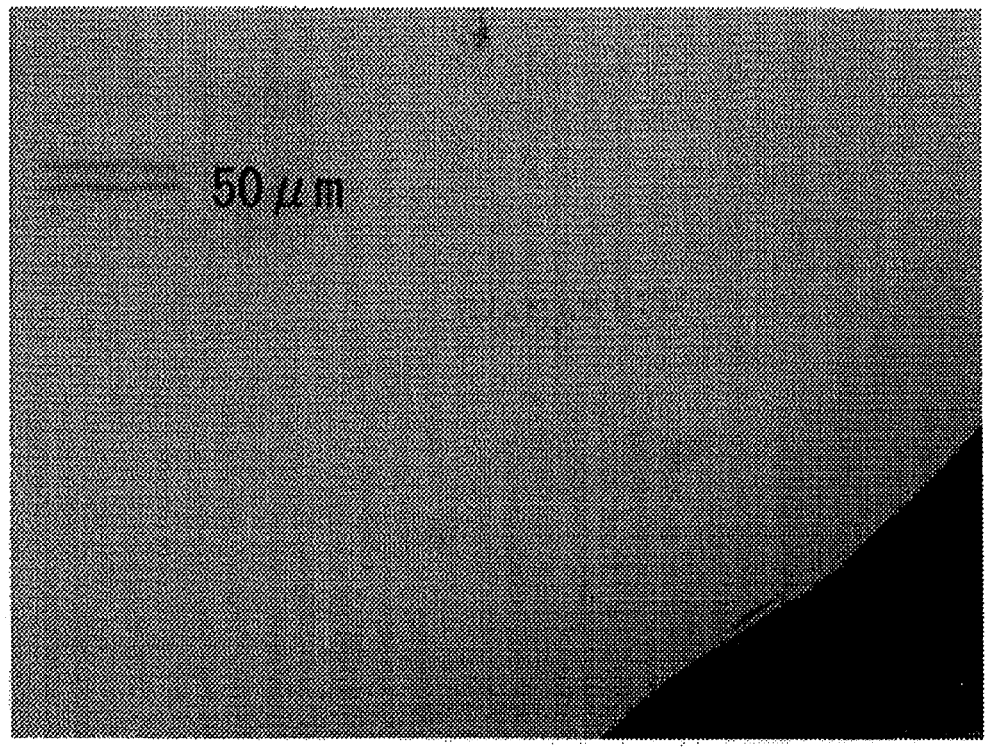
FIG. 9 is an enlarged view of the mark obtained in Example 2 (50 μm, blue marking, ×4).
Figure 10:
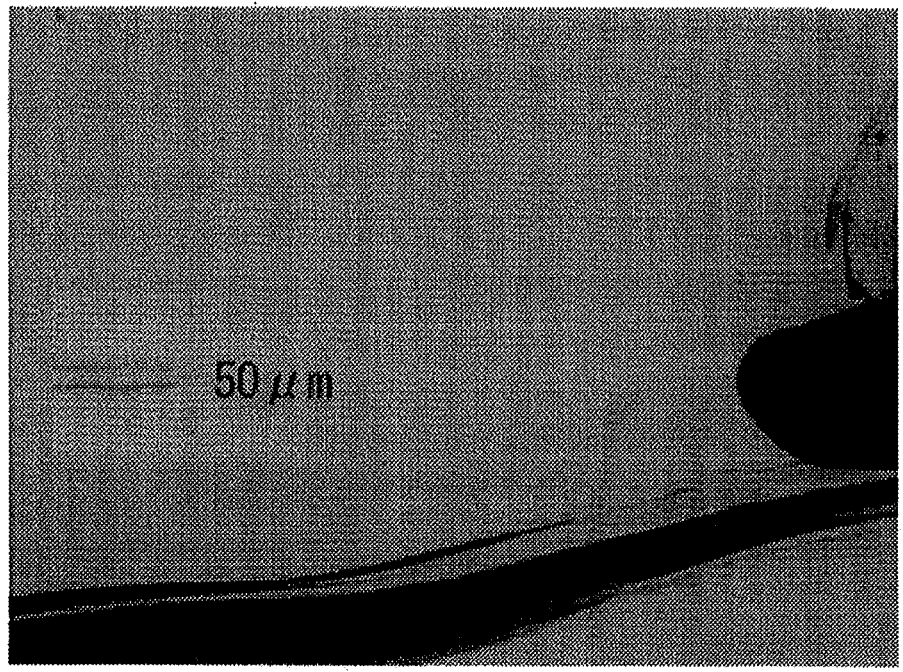
FIG. 10 is an enlarged view of the mark obtained in Example 3 (50 μm, yellow marking, ×2).
Figure 11:
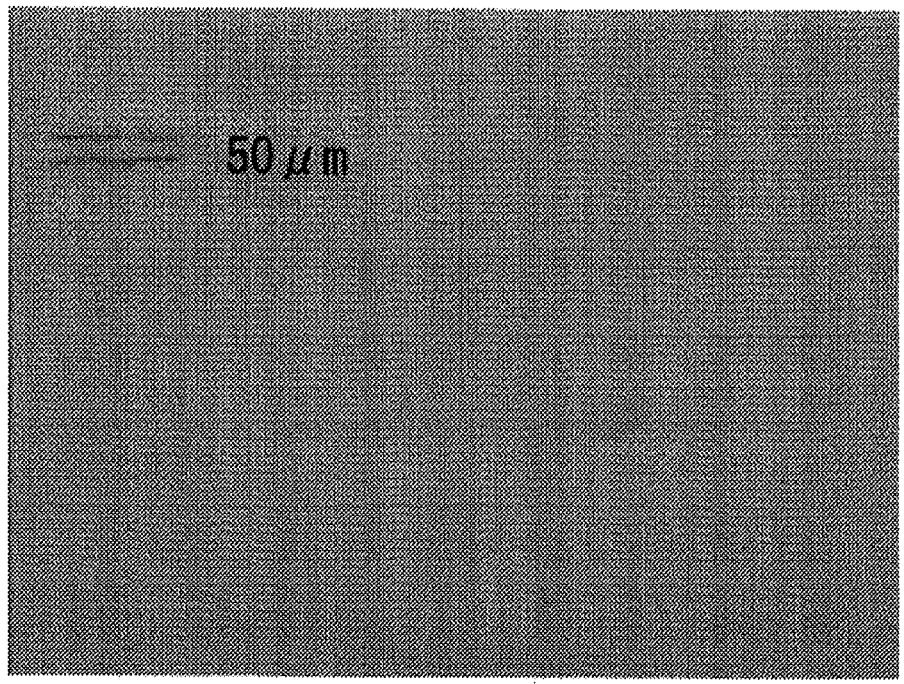
FIG. 11 is an enlarged view of the mark obtained in Example 4 (30 μm, yellow marking, ×4).
Figure 12:
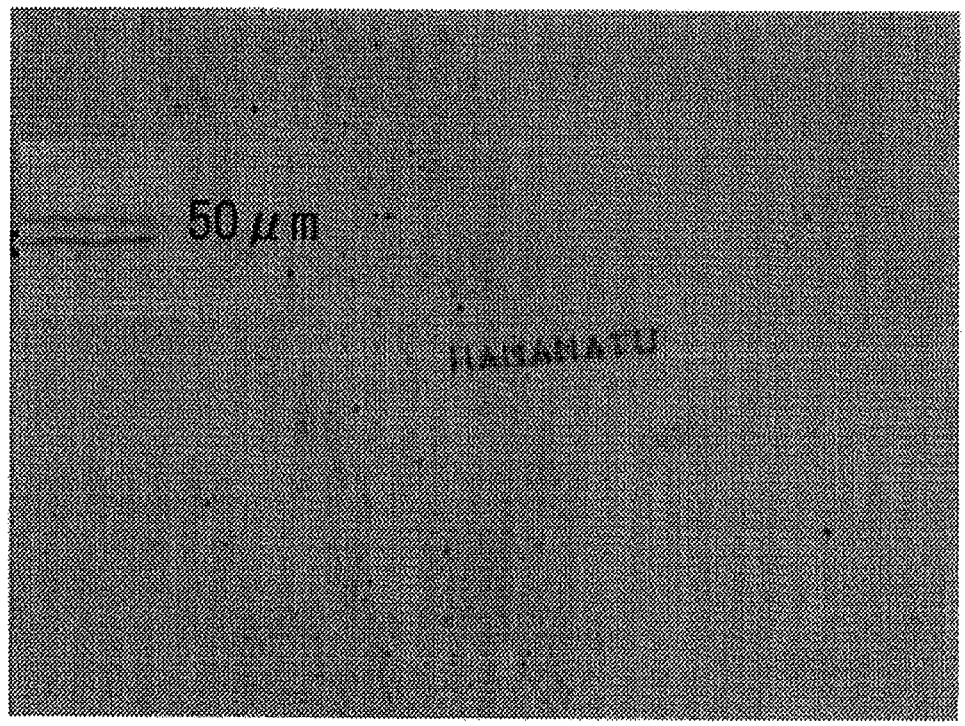
FIG. 12 is an enlarged view of the mark obtained in Example 5 (50 μm, red marking, ×2).
Figure 13:
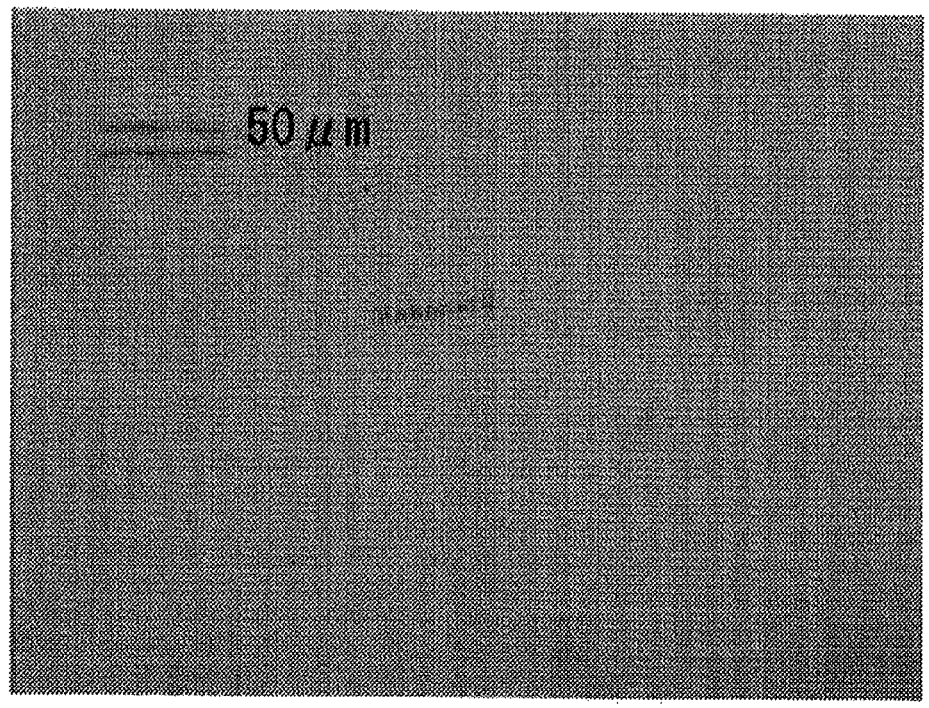
FIG. 13 is an enlarged view of the mark obtained in Example 6 (30 μm, red marking, ×4).
Figure 14:
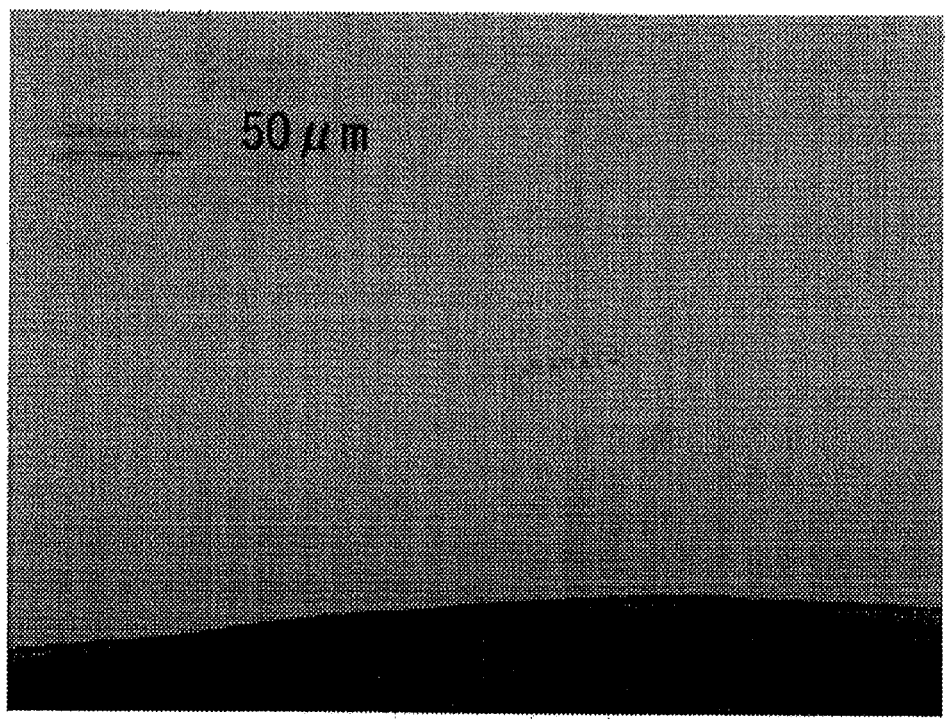
FIG. 14 is an enlarged view of the mark obtained in Example 7 (30 μm, blue marking, ×4).
Figure 15:
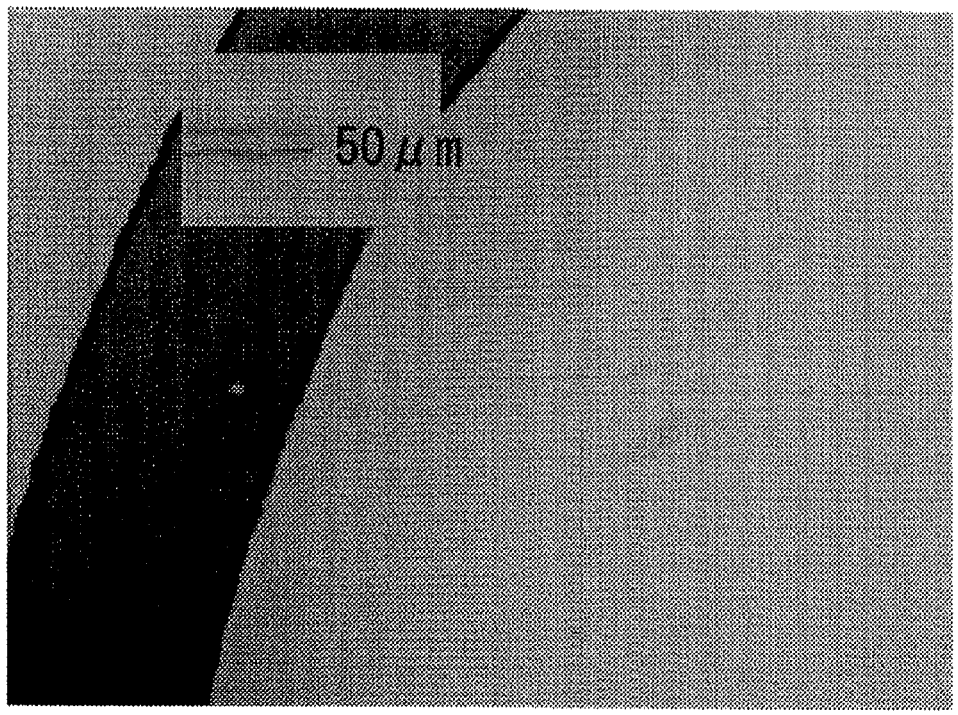
FIG. 15 is an enlarged view of the mark obtained in Example 8 (30 μm, yellow marking, ×4).
Figure 16:
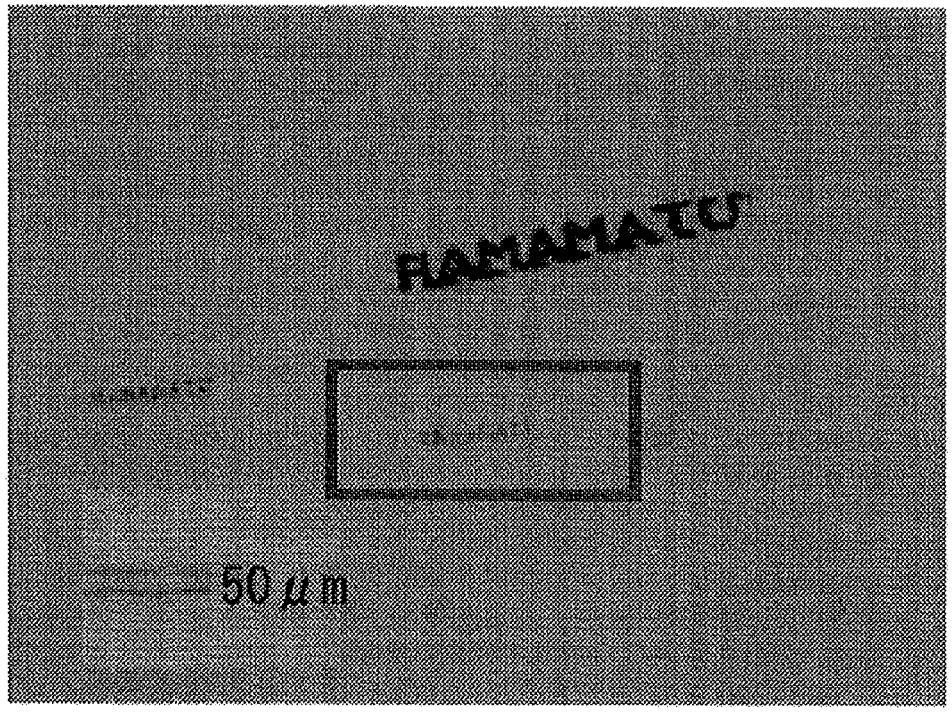
FIG. 16 is an enlarged view of the mark obtained in Example 9 (30 μm, red marking, ×4).
Figure 17:
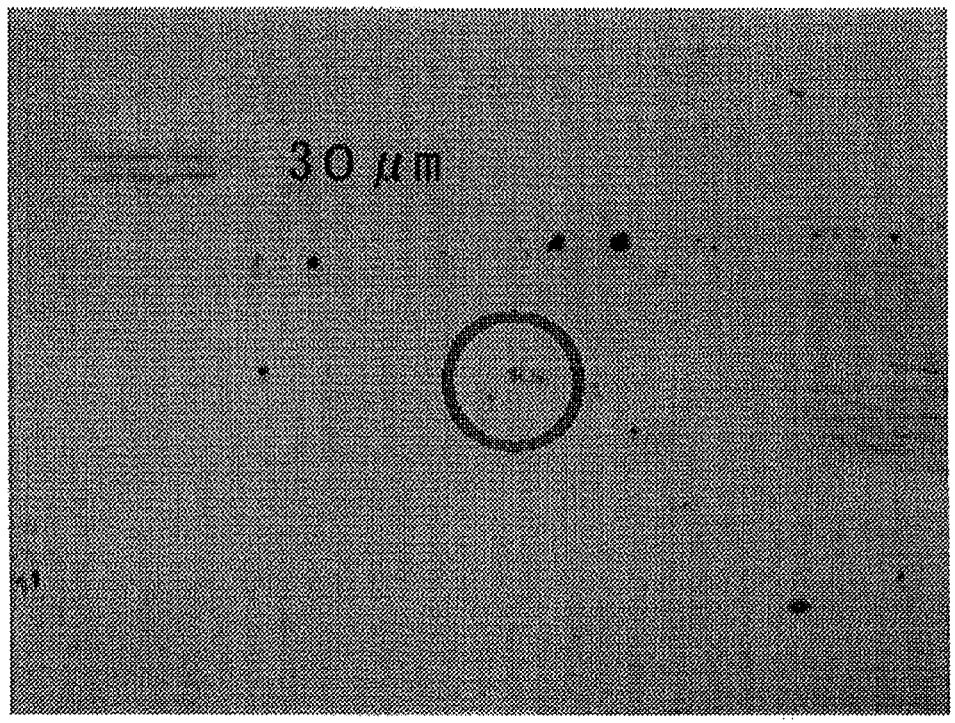
FIG. 17 is an enlarged view of the mark obtained in Example 10 (20 μm, red marking, ×4).
Figure 18:
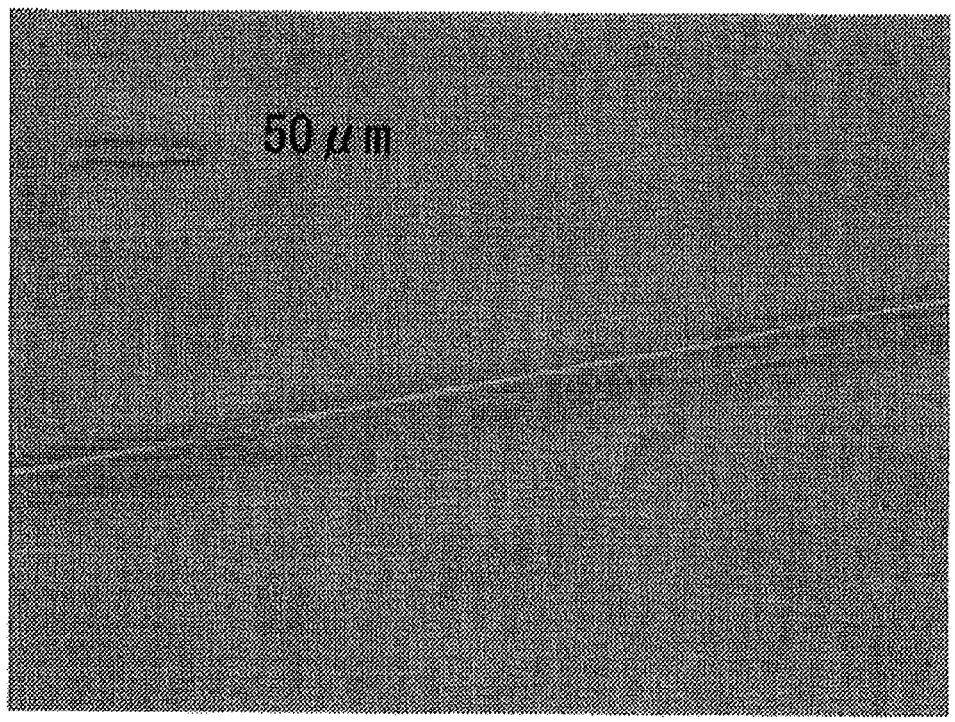
FIG. 18 is an enlarged view of the mark obtained in Example 11 (30 μm, blue marking, ×4).
Figure 19:
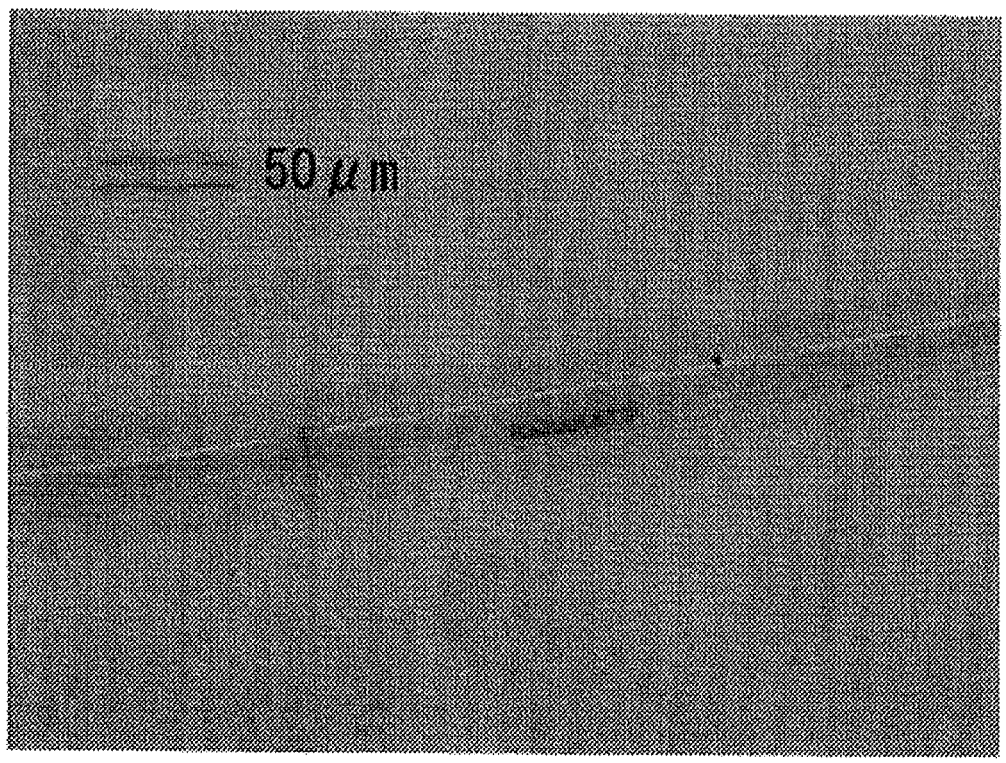
FIG. 19 is an enlarged view of the mark obtained in Example 12 (30 μm, red marking, ×4).

The laser irradiation apparatus 1 shown in FIG. 6 includes a laser irradiation means 2 integrally comprising a violet laser diode (VLD) as a laser oscillator 21, a collimate lens, and a correcting plate to which wavefront correction had been applied. The emitted light was reflected downward at a right angle with a beam splitter 4 and was focused on the surface 6 of a substrate W by an objective lens 5. The state of the irradiated portion of the surface 6 was then observed by using a measurement means 13.

Disperse Dye and Formulation

Figure 1:
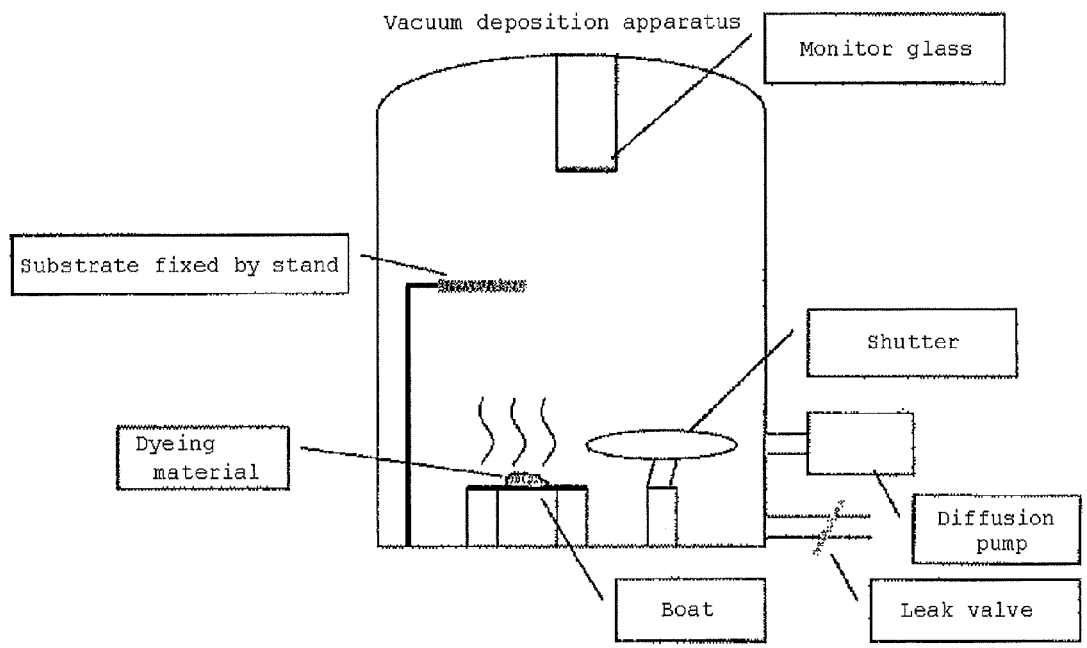
FIG. 1 is a conceptual diagram where a coloring material is evaporated and/or sublimated using a vacuum deposition apparatus to deposit the coloring material on a substrate surface.
Figure 2:
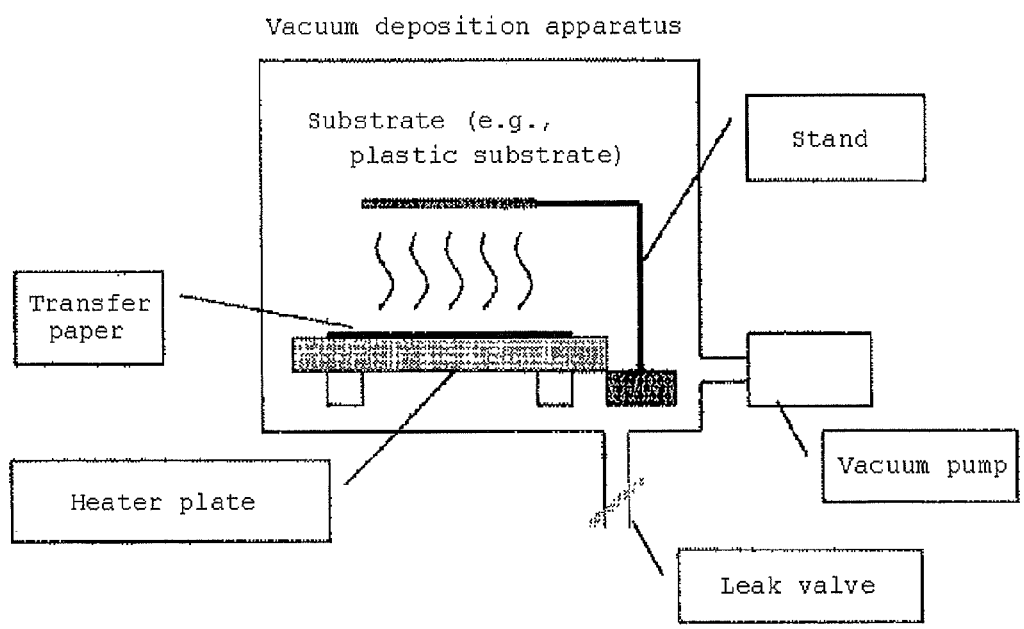
FIG. 2 is a conceptual diagram where a coloring material is evaporated and/or sublimated using a transfer paper (when the substrate is located above the paper).
Figure 3:
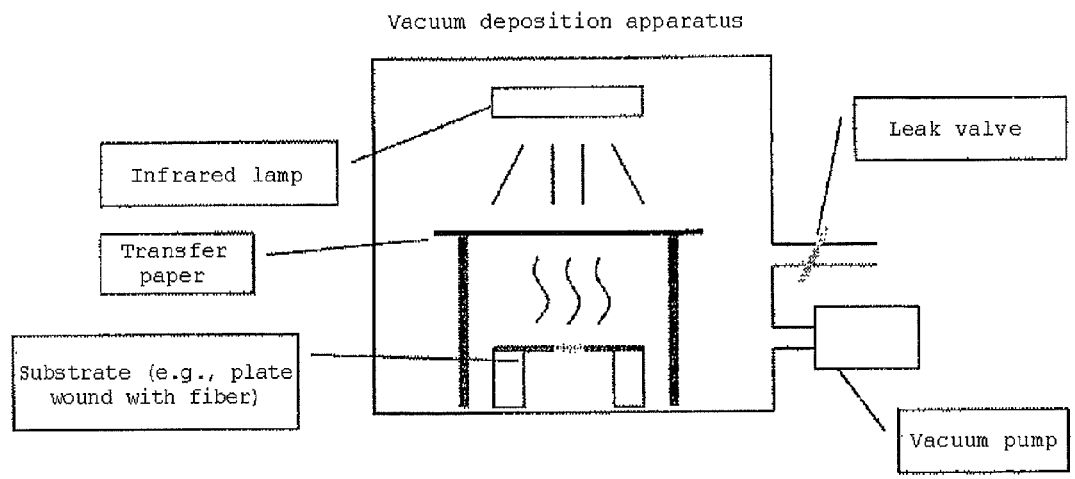
FIG. 3 is a conceptual diagram where a coloring material is evaporated and/or sublimated using a transfer paper (when the substrate is located below the paper).
Figure 4:
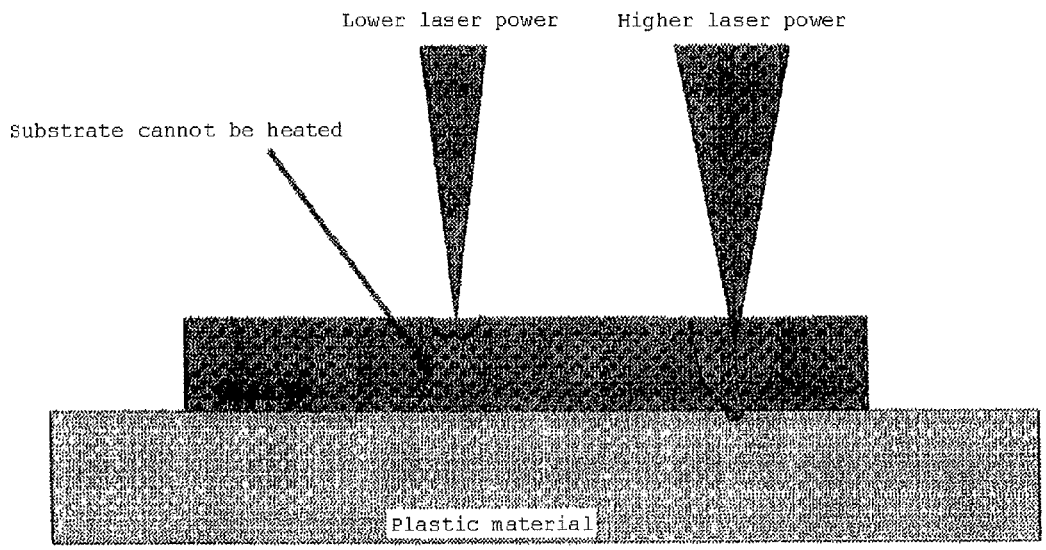
FIG. 4 is a conceptual diagram showing that the size of a mark varies depending on the thickness of a coloring material film and the intensity of laser energy.
Figure 5:
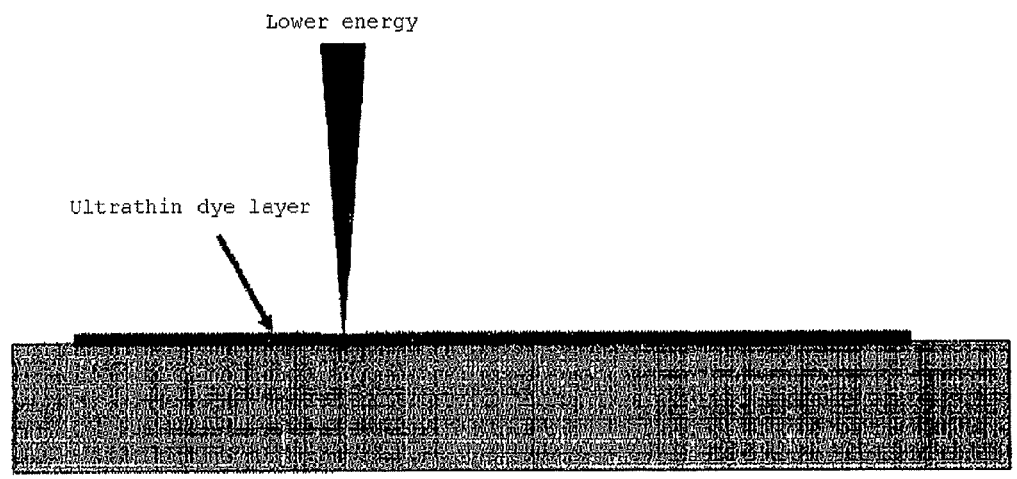
FIG. 5 is a conceptual diagram showing that the size of a mark varies depending on the thickness of a coloring material film and the intensity of laser energy.

C.I. Disperse Blue 56 (blue), C.I. Disperse Yellow 64 (yellow), and C.I. Disperse Red 60 (red) (disperse dyes; 10 wt. %), 20 wt. % of a dispersant (Demol MS, produced by Kao), and 70 wt. % of pure water were mixed and dispersed to fine particles using a bead mill. The mixture was then suction-filtered through a filter with a pore size of about 1 um (glass fiber filter paper GF/B) to remove large particles, waste, etc. Pure water was added to the mixture after suction filtration to adjust the dye concentration to 5% while measuring absorbance. Each dye shown in Table 1 was produced in this manner. The resulting inks were poured into an ink-jet printer (RJ-1300V/2, produced by Mutoh Industries Ltd.) and printed on a transfer paper. The software used was Photoshop, and solid printing of each color was performed on the transfer paper. The printed transfer paper was placed above a plastic substrate (base material), as shown in FIG. 3. After evacuation to a vacuum of 0.5 kPa, the plastic substrate was irradiated with an infrared lamp to uniformly deposit each dye on the substrate.

The following plastic substrates were used.

Polycarbonate Sheet

Panlite Sheet (produced by Teijin Chemicals Ltd.), clear, 2 mm in thickness
NF2000 (produced by Mitsubishi Gas Chemical Company, Inc.), 1 mm in thickness Polyester Sheet Petec PET 6100 (produced by Takiron Co., Ltd.), 2 mm in thickness Polyester Flat Yarn Using a starting material PET (polyester resin MA-2103, produced by Unitika Ltd.), a flat yarn with a longer diameter of 150 μm and a shorter diameter of 80 μm was produced according to a known method.

The thickness of the coloring material thin film was, in the case of polycarbonate, about 0.5 μm at two times, and about 1 μm at four times; in the case of polyester, the film thickness was about 1 μm at two times, and 2 μm at four times. Note that "two times" indicates that 100% ink per unit area of transfer paper was uniformly applied by solid printing during printing, and "four times" indicates that 200% ink was printed by double printing.

Laser Irradiation Conditions

The output power of the violet laser diode was about 3 to 45 mW, and continuous wave (CW) or pulsed wave (PW) was used. The movement speed of the XY stage 8 was 1 to 5 mm/s. The pulse frequency was 60 Hz, and the duty ratio of the pulse width was 1/16.

Target For Marking

Table 1 below shows the dyes and twelve substrates W1 to W12 used.

Minute Marking

In Examples 1 to 12, letters "HM" and "HAMAMATU" (letter width: 20 to 50 μm) were marked on the substrates W and flat yarns. Because the letters were very minute, a pulsed laser beam was irradiated. FIGS. 8 to 19 show the results. As is clear from FIGS. 8 to 19, the method of the present invention allowed clear marking of the letters "HM" and "HAMAMATU" (letter width: 20 to 50 μm).

EXAMPLE 13

A dye was applied to sheet-like polyethylene terephthalate (PET) substrates and polycarbonate (PC) substrates by the vapor-phase transfer method in the same manner as in Examples 1 to 12 so as to have film thicknesses shown in Tables 2 to 5. The dye used in Example 13 was a disperse dye, C.I. Disperse Blue 56 (blue). Subsequently, the substrates on which the dyes had been applied were irradiated with a laser beam to print the letters "HAMAMATU" in the same manner as in Examples 1 to 12. In this case, the output power of the violet laser diode was about 42 mW, and pulsed wave (PW) was used. The movement speed of the XY stage 8 was 0.3 mm/s. The pulse frequency was 200 Hz, and the duty ratio of the pulse width was 1/16. The spot diameter was 8 μm with a half bandwidth. The laser energy was adjusted using filters (30% attenuation filter: AND-50S-30, 50% attenuation filter: AND-50S-50, and 70% attenuation filter: AND-50S-70). Tables 2 to 5 show the relationships between the film thickness of each substrate and the energy of the irradiated laser. The letters formed by laser radiation were evaluated according to the following criteria.

Evaluation Criteria

5: Letters are clear and deep.
4: Letters are clear but faint.
3: Letters are not clear but are easily legible.
2: Letters are somewhat legible.
1: Letters are not legible.

TABLE 1

| Example | Substrate No. | Material | Form | Thickness (mm) | Dye (concentration and color) |
|---|---|---|---|---|---|
| Ex. 1 | W1 | Polycarbonate | Sheet | 2 | x2, blue |
| Ex. 2 | W2 | Polycarbonate | Sheet | 1 | x4, blue |
| Ex. 3 | W3 | Polycarbonate | Sheet | 1 | x2, yellow |
| Ex. 4 | W4 | Polycarbonate | Sheet | 1 | x4, yellow |
| Ex. 5 | W5 | Polycarbonate | Sheet | 1 | X2, red |
| Ex. 6 | W6 | Polycarbonate | Sheet | 2 | x4, red |
| Ex. 7 | W7 | Polyester | Sheet | 1 | x4, blue |
| Ex. 8 | W8 | Polyester | Sheet | 1 | x4, yellow |
| Ex. 9 | W9 | Polyester | Sheet | 1 | x4, red |
| Ex. 10 | W10 | Polyester | Sheet | 2 | x4, red |
| Ex. 11 | W11 | Polyester | Flat yarn shorter diameter: 80 μm, longer diameter: 150 μm | — | x4, blue |
| Ex. 12 | W12 | Polyester | Flat yarn shorter diameter: 80 μm, longer diameter: 150 μm | — | x4, red |

TABLE 2

| | | Film thickness | | | |
|---|---|---|---|---|---|
| | PET substrate Letter size: 50 μm | 1.59 μm | 0.93 μm | 0.41 μm | 0.02 μm |
| Evaluation | No. 1 (No filter) | 1.8 | 4 | 5 | 4.3 |
| | No. 2 (30% attenuation filter) | 4.3 | 5 | 1 | 1 |
| | No. 3 (50% attenuation filter) | 4.8 | 1.5 | 1 | 1 |
| | No. 4 (70% attenuation filter) | 1 | 1 | 1 | 1 |
| | No. 5 (79% attenuation filter) | 1 | 1 | 1 | 1 |

*The numbers in the table are average values of evaluation by 20 people. The same applies to Tables 3 to 5.

TABLE 3

| | | Film thickness | | | |
|---|---|---|---|---|---|
| | PET substrate Letter size: 30 μm | 1.59 μm | 0.93 μm | 0.41 μm | 0.02 μm |
| Evaluation | No. 6 (No filter) | 1.3 | 2.3 | 4.8 | 3.5 |
| | No. 7 (30% attenuation filter) | 1.5 | 5 | 1 | 1 |
| | No. 8 (50% attenuation filter) | 4.3 | 1 | 1 | 1 |
| | No. 9 (70% attenuation filter) | 3.8 | 1 | 1 | 1 |
| | No. 10 (79% attenuation filter) | 1 | 1 | 1 | 1 |

TABLE 4

| | | Film thickness | | | |
|---|---|---|---|---|---|
| | PC substrate Letter size: 50 μm | 2.0 μm | 0.93 μm | 0.81 μm | 0.053 μm |
| Evaluation | No. 11 (No filter) | 2.3 | 3.8 | 5 | 4 |
| | No. 12 (30% attenuation filter) | 3.8 | 4.8 | 4.8 | 1 |
| | No. 13 (50% attenuation filter) | 4.8 | 5 | 3.3 | 1 |
| | No. 14 (70% attenuation filter) | 4.8 | 1.8 | 1.3 | 1 |
| | No. 15 (79% attenuation filter) | 1.8 | 1 | 1 | 1 |

TABLE 5

| | | Film thickness | | | |
|---|---|---|---|---|---|
| | PC substrate Letter size: 30 μm | 2.0 μm | 0.93 μm | 0.81 μm | 0.053 μm |
| Evaluation | No. 16 (No filter) | 1.3 | 1.8 | 3.3 | 4.3 |
| | No. 17 (30% attenuation filter) | 2 | 3 | 4.5 | 4 |
| | No. 18 (50% attenuation filter) | 3.8 | 4.5 | 3.8 | 2 |
| | No. 19 (70% attenuation filter) | 4.3 | 4 | 1 | 1 |
| | No. 20 (79% attenuation filter) | 1.8 | 1 | 1 | 1 |

Table 6 shows laser energy (mW) irradiated to the thin film when each filter was used.

Table 6 shows laser energy (mW) irradiated to the thin film when each filter was used.

TABLE 6

| | Laser energy (mW) |
|---|---|
| No filter | 37-42 |
| 30% attenuation filter | 26-34 |
| 50% attenuation filter | 18-24 |
| 70% attenuation filter | 11-15 |

As is clear from the results of the substrates No. 1 to No. 5 of Example 13, when a polyester substrate (e.g., polyethylene terephthalate) is used, letters about 50 μm in size are printed, and the thickness of the coloring material thin film 27 is about 1.5 to 1.7 μm in the present invention, the output energy of the laser is generally about 18 to 34 mW (specifically, a 30% or 50% attenuation filter is used), and preferably about 20 to 32 mW. Moreover, when the thickness of the coloring material thin film 27 is about 0.8 to 1 μm, the output energy of the laser is generally about 26 to 42 mW, and preferably about 28 to 42 mW. Furthermore, when the thickness of the coloring material thin film 27 is 0.3 to 0.5 μm, the output energy of the laser is generally about 37 to 42 mW, and preferably about 39 to 42 mW. When the thickness of the coloring material thin film 27 is 0.01 to 0.05 μm, the output energy of the laser is also generally about 37 to 42 mW, and preferably about 39 to 42 mW.

Additionally, the results of the substrates No. 6 to No. 10 of Example 13 show that, for example, when letters about 30 μm in size are printed, a polyester substrate (e.g., polyethylene terephthalate) is used, and the thickness of the coloring material thin film 27 is about 1.5 to 1.7 μm, the output energy of the laser is generally about 18 to 24 mW, and preferably about 20 to 22 mW. Moreover, when the thickness of the coloring material thin film 27 is about 0.8 to 1 μm, the output energy of the laser is generally about 26 to 34 mW, and preferably about 28 to 32 mW. Furthermore, when the thickness of the coloring material thin film 27 is 0.3 to 0.5 μm, the output energy of the laser is generally about 37 to 42 mW, and preferably about 39 to 42 mW. When the thickness of the coloring material thin film 27 is 0.01 to 0.05 μm, the output energy of the laser is also generally about 37 to 42 mW, and preferably about 39 to 42 mW.

In contrast, the results of the substrates No. 11 to No. 15 of Example 13 show that when a polycarbonate substrate is used, letters about 50 μm in size are printed, and the thickness of the coloring material thin film 27 is 1.5 to 2.5 μm, the output energy of the laser is generally about 11 to 24 mW, and preferably about 12 to 23 mW. Moreover, when the thickness of the coloring material thin film 27 is 0.8 to 1 μm, the output energy of the laser is generally about 18 to 34 mW, and preferably about 20 to 32 mW. Furthermore, when the thickness of the coloring material thin film 27 is 0.07 to 0.09 μm, the output energy of the laser is generally about 26 to 42 mW, and preferably about 28 to 42 mW. When the thickness of the coloring material thin film 27 is 0.04 to 0.06 μm, the output energy of the laser is generally about 37 to 42 mW, and preferably about 39 to 42 mW.

Additionally, the results of the substrates No. 16 to No. 20 of Example 13 show that, for example, when letters about 30 μm in size are printed, a polycarbonate substrate is used, and the thickness of the coloring material thin film 27 is about 1.5 to 2.5 μm, the output energy of the laser is generally about 11 to 15 mW, and preferably about 11 to 14 mW. Moreover, when the thickness of the coloring material thin film 27 is about 0.8 to 1 μm, the output energy of the laser is generally about 18 to 24 mW, and preferably about 20 to 22 mW. Furthermore, when the thickness of the coloring material thin film 27 is 0.07 to 0.09 μm, the output energy of the laser is generally about 26 to 34 mW, and preferably about 28 to 32 mW. When the thickness of the coloring material thin film 27 is 0.04 to 0.06 μm, the output energy of the laser is generally about 37 to 42 mW, and preferably about 39 to 42 mW.

REFERENCE SIGNS LIST

1. Laser irradiation apparatus
2. Laser beam generating means
3. Laser beam
4. Beam splitter
5. Objective lens
6. Surface
7. Optical axis
8. XY stage
9. Z stage
13. Measurement means
14. Lens
15. Imaging camera
16. Arithmetic processing means
17. Display screen
21. Laser oscillator
22. Collimate lens
23. Correcting plate
27. Coloring material thin film
W. Substrate

The invention claimed is:

1. A laser marking method comprising the steps of:
   (1) depositing a coloring material on a surface of a substrate of thermoplastic material to form a thin film of the coloring material; and
   (2) sequentially applying a laser beam to the thin film of the coloring material having a thickness of 0.5-5 μm thick in conformity with a complete symbol or letter to cause the portions of the substrate irradiated with the laser beam to soften and to cause the thus softened portions to mix with the coloring material to develop the complete symbol or letter having a width of about 20-50 μm in size on the surface of the substrate,
   wherein in the step (1), the coloring material is deposited by a vapor-phase transfer method, the vapor-phase transfer method comprising steps of:
   supplying a dyeing material in which the coloring material is dissolved or dispersed to fine particles to a surface of a base material;
   placing the base material so that the surface of the base material faces the substrate out of contact in vacuum;
   heating the base material and evaporating and/or sublimating the coloring material entirely and equally at once; and
   depositing the coloring material on the substrate, thereby forming the thin film of the coloring material.

2. The laser marking method according to claim 1, wherein the coloring material is at least one member selected from the group consisting of dyes and pigments.

3. A method of detecting a substrate with a mark formed by the method according to claim 2, comprising the step of checking for the presence of the mark or pattern formed on the substrate.

4. The laser marking method according to claim 1, wherein the laser beam to be applied to the thin film of the coloring material in conformity with the predetermined marking shape is precisely focused.

5. A method of detecting a substrate with a mark formed by the method according to claim 4, comprising the step of checking for the presence of the mark or pattern formed on the substrate.

6. A method of detecting a substrate with a mark formed by the method according to claim 1, comprising the step of checking for the presence of the mark or pattern formed on the substrate.

7. The laser marking method according to claim 1, further comprising the step of applying a surfactant to the substrate prior to depositing the color material for improving adhesion of the color material to the surface of the substrate.

8. The laser marking method according to claim 1, wherein the laser beam is a unimodal intensity distribution laser beam.

* * * * *